(12) United States Patent
Siegel et al.

(10) Patent No.: US 7,117,865 B2
(45) Date of Patent: *Oct. 10, 2006

(54) BENCH TOP GRILL ASSEMBLY

(75) Inventors: Dan Siegel, Huntington, NY (US);
Adam Krent, Brooklyn, NY (US)

(73) Assignee: Lifetime Hoan Corporation, Westbury, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/794,978

(22) Filed: Mar. 5, 2004

(65) Prior Publication Data

US 2004/0216733 A1 Nov. 4, 2004

(51) Int. Cl.
*A47J 37/00* (2006.01)
*F24C 15/10* (2006.01)

(52) U.S. Cl. .......................... 126/26; 126/215
(58) Field of Classification Search ............... 431/326; 126/26, 43, 44, 50, 214 A, 215
See application file for complete search history.

(56) References Cited

U.S. PATENT DOCUMENTS

| D098,885 | S |   | 1/1936  | Pearson              |
|----------|---|---|---------|----------------------|
| D171,542 | S |   | 2/1954  | Harrel               |
| D172,672 | S |   | 7/1954  | Lennox               |
| D175,253 | S | * | 8/1955  | Hibachi ........ D7/337 |
| D185,280 | S | * | 5/1959  | Hibachi ........ D7/337 |
| D193,163 | S |   | 7/1962  | Levi                 |
| 3,191,593 | A |  | 6/1965  | Kruck                |
| D219,693 | S |   | 1/1971  | Halun                |
| D220,371 | S |   | 3/1971  | Strauss              |
| 3,574,505 | A | * | 4/1971  | Kimball ........ 431/344 |
| 3,745,303 | A | * | 7/1973  | Epperson et al. ........ 219/218 |
| 3,978,782 | A |   | 9/1976  | Werling              |
| 4,023,553 | A |   | 5/1977  | London et al.        |
| 4,150,610 | A |   | 4/1979  | Ferrara              |
| 4,351,314 | A |   | 9/1982  | Morton               |
| 4,436,356 | A |   | 3/1984  | Stelling             |
| 4,481,408 | A |   | 11/1984 | Scheufler            |
| 4,526,158 | A |   | 7/1985  | Lee                  |
| 4,635,614 | A |   | 1/1987  | Segroves             |
| 4,706,817 | A |   | 11/1987 | Greathouse           |
| 4,748,967 | A |   | 6/1988  | Smith                |
| 4,759,276 | A | * | 7/1988  | Segroves ........ 99/339 |
| 4,788,905 | A |   | 12/1988 | Von Kohorn           |
| 4,881,520 | A | * | 11/1989 | Hefling ........ 126/44 |
| 4,924,845 | A |   | 5/1990  | Johnson              |
| 5,143,046 | A |   | 9/1992  | Koziol               |
| 5,168,796 | A |   | 12/1992 | Porton et al.        |

(Continued)

FOREIGN PATENT DOCUMENTS

CH 689609 7/1999

(Continued)

OTHER PUBLICATIONS

Cosl Grilling Assembly located at http://www.getcosi.com/shop/shop_product.asp?catID=277, dated Apr. 3, 2004, (2 pages).

*Primary Examiner*—Alfred Basichas
(74) *Attorney, Agent, or Firm*—Myron Greenspan Lachenbach Siegel, LLP

(57) ABSTRACT

The present invention provides a bench top grill assembly that includes a rigid continuous grill body, a grill grate removably covering an upper opening, and a fuel element receptacle or container removably positionable in the grill body through a lateral opening dimensioned to closely receive the container. A safety handle projects from the fuel element container through the lateral opening away from sides of the grill body so that the handle does not become heated during use and may be safely gripped. A support table with multiple dimensions, forks, and condiment dishes increase the convenience of the bench top grill assembly.

18 Claims, 9 Drawing Sheets

U.S. PATENT DOCUMENTS

| | | |
|---|---|---|
| 5,183,027 A | 2/1993 | Saldana |
| 5,257,616 A | 11/1993 | Koziol |
| 5,431,091 A | 7/1995 | Couture |
| 5,711,210 A | 1/1998 | Kaufman |
| 5,775,315 A | 7/1998 | Baykal |
| 5,782,172 A | 7/1998 | Schacht |
| 5,782,173 A | 7/1998 | Fabrikant et al. |
| 5,819,718 A | 10/1998 | Leiser |
| 5,906,152 A | 5/1999 | Alcorn |
| 5,941,229 A | 8/1999 | Schlosser et al. |
| 5,970,856 A | 10/1999 | Fabrikant et al. |
| 6,035,768 A | 3/2000 | Kaufman |
| 6,065,466 A | 5/2000 | Baykal |
| 6,153,857 A | 11/2000 | Gunnels |
| D435,191 S | 12/2000 | Cooper |
| 6,186,055 B1 | 2/2001 | DeMars et al. |
| 6,196,213 B1 | 3/2001 | Van Der Voude |
| 6,302,097 B1 | 10/2001 | Rivera |
| 6,470,875 B1 | 10/2002 | Liu |
| 6,543,436 B1 | 4/2003 | Montgomery |
| 6,606,987 B1 | 8/2003 | DeMars |
| 6,701,912 B1 * | 3/2004 | Siegel et al. .................. 126/44 |
| 2002/0033172 A1 | 3/2002 | Ruiz |
| 2002/0069866 A1 | 6/2002 | DeMars |
| 2002/0078943 A1 | 6/2002 | Montgomery |
| 2003/0192526 A1 | 10/2003 | DeMars |
| 2003/0234014 A1 | 12/2003 | Fitzgerald |
| 2005/0205078 A1 * | 9/2005 | Siegel et al. .................. 126/44 |
| 2006/0005714 A1 * | 1/2006 | Siegel et al. .................. 99/450 |

FOREIGN PATENT DOCUMENTS

EP        0811346        6/1996

* cited by examiner

BENCH TOP GRILL ASSEMBLY

PRIORITY CLAIM

This application claims domestic priority from U.S. application Ser. No. 10/428,621. filed May 2, 2003. now issued as U.S. Pat. No. 6,701,912, on Mar. 9, 2004, and incorporates the contents of the same by reference herein.

BACKGROUND OF THE INVENTION

1. Field of the Invention

The present invention relates to a bench top grill assembly. More specifically, the present invention relates to a bench top grill assembly providing improved safety and convenience features in a compact shape.

2. Description of the Related Art

Conventional grilling, heating and warming apparatus provide substantial detriments and operator safety risks, as noted below.

One type of conventional warming apparatus employs a solid/semi-solid fuel canister in a wire frame under a pan to be heated. This design allows flames and thermal energy issuing from a lit fuel canister to rise under pan and warm the contents. This design is inexpensive to manufacture but is unstable with heavy pans. This design also allows cross winds to affect the fuel canister and redirect the thermal energy in a direction other than toward the pan, risking fire hazards, heating of the wire frame, and damage to surrounding objects.

This wire frame design also makes it difficult to access the hot fuel canister for changing and replacement. As the fuel canister is retained under the pan, the safest access would be to remove the pan causing additional inconvenience and risk of spilling. If the fuel canister is accessed from the side, a special tool is required to grip the hot canister body and lift it from its retaining wire cradle, risking spilling of the now liquid fuel mixture and fire.

Alternative conventional embodiments have expanded on the above common themes by adding multiple fuel canister, replacing the wire frame with differently shaped wire frames, designs incorporating stamped and folded metal, and a multitude of collapsible designs for camping and recreation. Some of these conventional designs provide a grilling rack suspended over the fuel canister to support a pan or other item to be heated.

Unfortunately, each of these conventional designs retains in many of the detriments noted above. Particularly, each of these conventional designs allows multiple side access to the fuel container, usually require direct contact with the fuel container during replacement or transport, fail to limit access to a single side of the design, and do not allow both direct grilling without a grilling rack and an easily replaceable grill rack.

Conventional designs also fail to provide for user convenience in many ways. Since grilling operations often involve the use of forks or skewers it would be convenient for conventional designs to provide easy storage for these utensils. Additionally, since conventional grilling operations often include condiments such as vegetables, meats, fruits, marshmallows, etc, it would be convenient for conventional designs to provide easy storage for these condiments. Unfortunately, none of the conventional grill designs incorporate the ability to securely store utensils and condiments while addressing each of the detriments noted above.

In summary, the problems of commercially available grill assemblies, include:

1. Instability in set-up, operation, and transport for both a grill mechanism and the solid/semi-solid (or liquid in use) fuel elements.
2. Safety hazards through easy access to heating elements, air currents affecting heating elements, inappropriate structural heating, difficulty in removing or replacing heating elements, and inability to direct the flame issuing from the heating element during use.
3. Inconvenience in transportability, operation on a working surface, storage for utensils and condiments in a safe, secure and transportable manner, and access to the heating element for removal or replacement without additional tools such as pliers.

SELECTED OBJECTS AND SUMMARY OF THE INVENTION

An object of the present invention is to provide an invention that overcomes the detriments of conventional grills as discussed above.

Another object of the present invention is to provide a bench top grill assembly that allows heating or cooking over an open flame or over a removable grate.

Another object of the present invention is to provide a bench top grill assembly that uses a solid/semi-solid disposable fuel element in an easily replaceable and disposable manner.

Another object of the present invention is to provide a bench top grill assembly that includes a lateral (side) opening for easy insertion/removal of a solid/semi-solid disposable fuel element.

Another object of the present invention is to provide a bench top grill assembly with a rigid grill body that may be used without a grill top.

Another object of the present assembly is to provide a bench top grill assembly including a receptacle for the solid/semi-solid fuel elements with a handle extending beyond a lateral opening so that the handle does not become heated and may be safely gripped outside the unit.

The present invention provides a bench top grill assembly that includes a rigid continuous grill body, a grill grate removably covering an upper opening, and a fuel element receptacle or container removably positionable in the grill body through a lateral opening dimensioned to closely receive the container. A safety handle projects from the fuel element container through the lateral opening away from sides of the grill body so that the handle does not become heated during use and may be safely gripped. A support table with multiple dimensions, forks, and condiment dishes increase the convenience of the bench top grill assembly.

According to an embodiment of the present invention there is provided a bench top grill assembly, comprising: a grill body, the grill body being a rigid continuous body substantially bounding an inner volume and defining a top opening opposite an inner bottom surface, one side of the grill body having a single side opening arrayed along a plane positioned substantially perpendicular to the top opening and the inner bottom surface, a grill grate, the grill grate providing a divided access to an inside of the grill housing, a grill grate removably positionable on the top opening and separable from the grill body during a use, whereby the top opening and the grill grate enable grilling over at least one of an open flame and a grated flame, a removable fuel container, the side opening having a shape allowing the removable fuel container to be inserted and withdrawn from the bounded inner volume during the use, and the fuel container operably capable of containing an external fuel element while allowing a flame to escape through a flame opening proximate the top opening when the fuel container is inserted into the bounded inner volume.

According to another embodiment of the present invention there is provided a bench top grill assembly, further comprising: a handle extending from the fuel container, the handle being substantially parallel to a bottom of the fuel container, and the handle projecting through the side opening away from the grill body during the use, whereby the handle does not become heated and is easily grasped to facilitate a safe removal of the fuel container from the grill body during or after a use.

According to another embodiment of the present invention there is provided a bench top grill assembly, wherein: the grill body is formed as at least one of a frusto-conical shape, a pot-bellied shape, and a pseudo-frustum shape, each the shape effective to bound the inner volume, define the single side opening, and receive the fuel container during the use.

According to another embodiment of the present invention there is provided a bench top grill assembly, further comprising: at least one receiving receptacle on the inner bottom surface of the grill body, at least one bottom guide bounding a portion of the receiving receptacle on the inner bottom surface, and a bottom of the fuel container slidably retained in the receiving receptacle by the at least one bottom guide during the use, whereby the fuel container is restrained from unintended lateral movement relative to the grill body and the single side opening during the use.

According to another embodiment of the present invention there is provided a bench top grill assembly, further comprising: a support table, a grill body depression on the support table, the grill body slidaby retained within the grill body depression and prevented from sliding laterally relative to the support table during the use, whereby the support table provides increased stability to the grill body, and the support table spacing the grill body from an external work surface, whereby the support table eliminates detrimental thermal transfer from the fuel container to the work surface to increase safety.

According to another embodiment of the present invention there is provided a bench top grill assembly, wherein: the support table is at least one of a rotatable support table and a fixed support table, the rotatable support table enabling a rotation of the support table and the grill body relative to the work surface, whereby a user convenience is increased, and the fixed support table is fixed relative to the grill body and the work surface, where the user is provided with an increased stability during the use.

According to another embodiment of the present invention there is provided a bench top grill assembly, further comprising: a least one grove on a top surface of the support table, the at least one groove shaped to receive at least one grill fork and prevent the fork from sliding relative to the top surface during a use, whereby a convenience of the bench top grill assembly is increased.

According to another embodiment of the present invention there is provided a bench top grill assembly, further comprising: at least one condiment depression on the support table, and the at least one condiment depression shaped to receive at least one condiment container and prevent a lateral movement of the container relative to the support table during the use, whereby a convenience and a safety of the bench top grill is increased.

According to another embodiment of the present invention there is provided a bench top grill assembly, further comprising: at least one disposable fuel element, the fuel element positionable within the removable fuel container prior to the use and removable from the fuel container after the use, whereby the bench top grill assembly is easily transported and shipped without the combustible fuel element and easily combined with the fuel element prior to the use.

According to another embodiment of the present invention there is provided a bench top grill assembly, wherein: the fuel container has a first total width dimension and a first total height dimension, the side opening having a second total width dimension and a second total height dimension, and the respective first dimensions being less than the respective the second dimensions, whereby the removable fuel container may be easily inserted and withdrawn from the grill body during the use without disturbing the grill body and being protected from unintended contact from directions other than those facing the side opening.

According to another embodiment of the present invention there is provided a bench top grill assembly, comprising: a grill body, the grill body being a rigid continuous body substantially bounding an inner volume and defining a top opening opposite an inner bottom surface, one side of the grill body having a single side opening arrayed along a plane positioned substantially perpendicular to the top opening and the inner bottom surface, a grill grate, the grill grate providing a divided access to an inside of the grill housing, a grill grate removably positionable on the top opening and separable from the grill body during a use, whereby the top opening and the grill grate enable grilling over at least one of an open flame and a grated flame, a removable fuel container, the side opening having a shape allowing the removable fuel container to be inserted and withdrawn from the bounded inner volume during the use, the fuel container operably capable of containing an external fuel element while allowing a flame to escape through a flame opening proximate the top opening when the fuel container is inserted in the bounded inner volume, a handle extending from the fuel container, the handle being substantially parallel to a bottom of the fuel container, and the handle projecting through the side opening away from the grill body during the use, whereby the handle does not become heated and is easily grasped and facilitates a safe removal of the fuel container from the grill body after a use.

According to another embodiment of the present invention there is provided a bench top grill assembly, wherein: the grill body is formed as at least one of a frusto-conical shape, a pot-bellied shape, and a pseudo-frustum shape, each the shape effective to bound the inner volume and receive the fuel container and support the grill grate during the use.

According to another embodiment of the present invention, there is provided a bench top grill assembly, in combination with: a support table, said support table supporting said grill body on an external work surface; at least one recess for retaining at least one eating utensil on said support table; said recess retaining said utensil during said use; at least one recess for condiments on said support table; and said recess for condiments retaining condiments during said use, whereby said bench top grill assembly is easily useable with both said utensils and said condiments.

The above, and other objects, features and advantages of the present invention will become apparent from the following description read in conduction with the accompanying drawings, in which like reference numerals designate the same elements.

DETAILED DESCRIPTION OF ALTERNATIVE EMBODIMENTS

In addressing the problems noted above, embodiments of the present invention provide a bench top grill assembly, as will be described.

Figure 1:
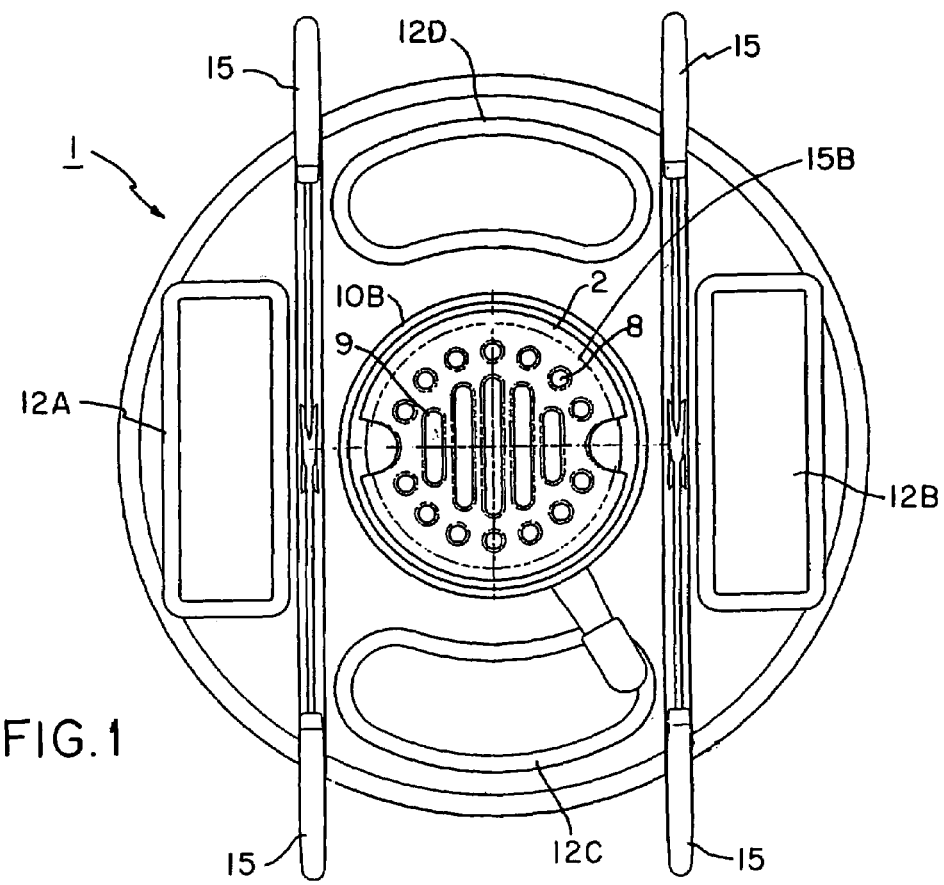
FIG. 1 is a top plan view of a bench top grill assembly according to one embodiment of the present invention.
Figure 2:
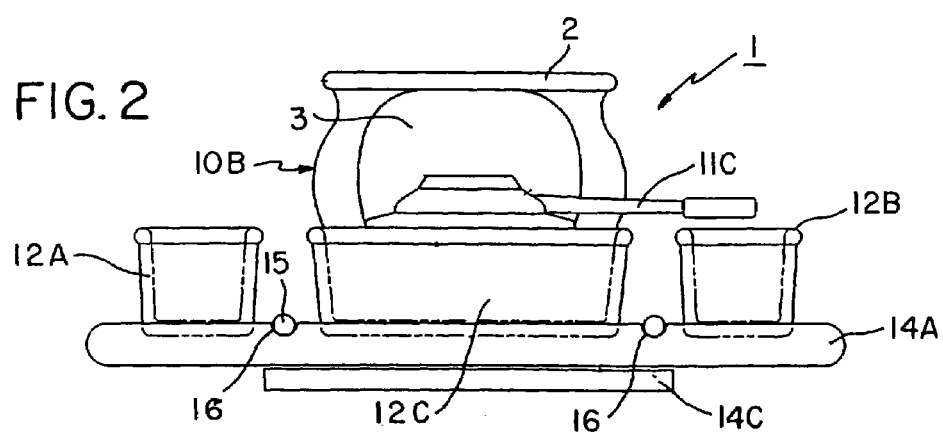
FIG. 2 is a side elevational view of a bench top grill assembly according to one embodiment of the present invention.
Figure 3:
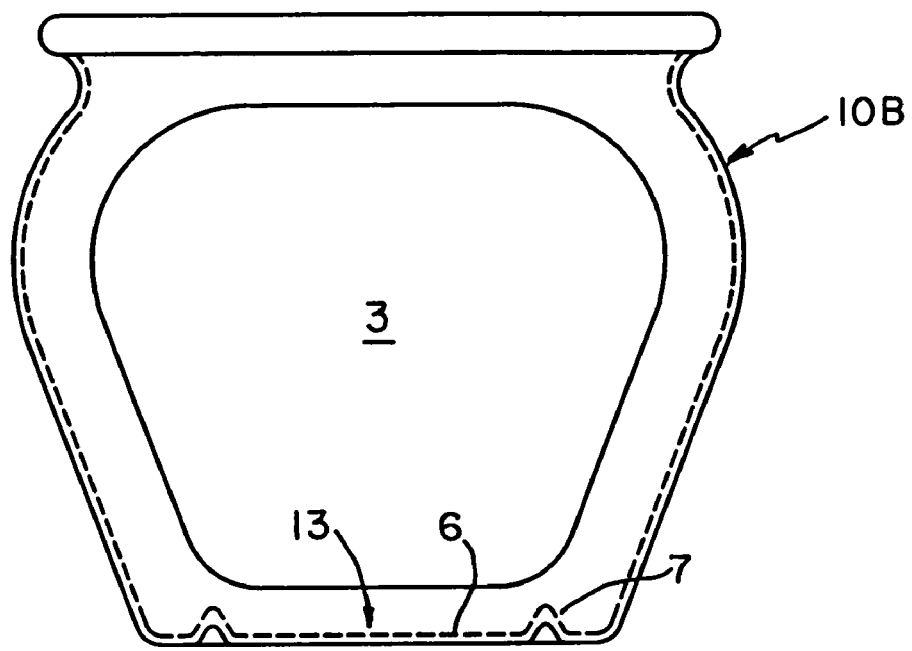
FIG. 3 is a side elevational view of a rigid grill body according to one embodiment of the present invention.
Figure 5:
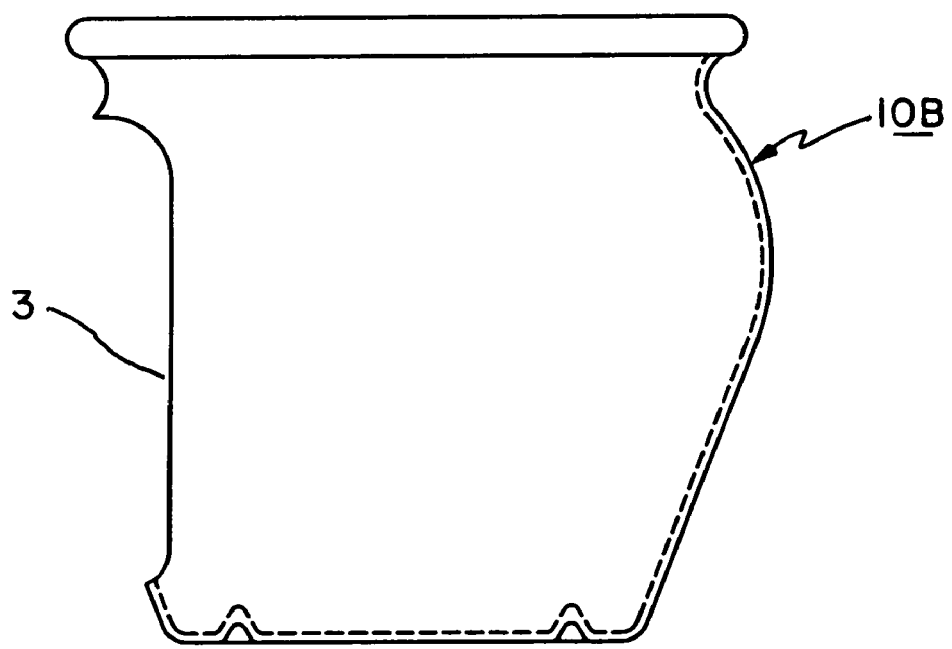
FIG. 5 is a side elevational view of the grill body as shown in FIG. 3.
Figure 4:
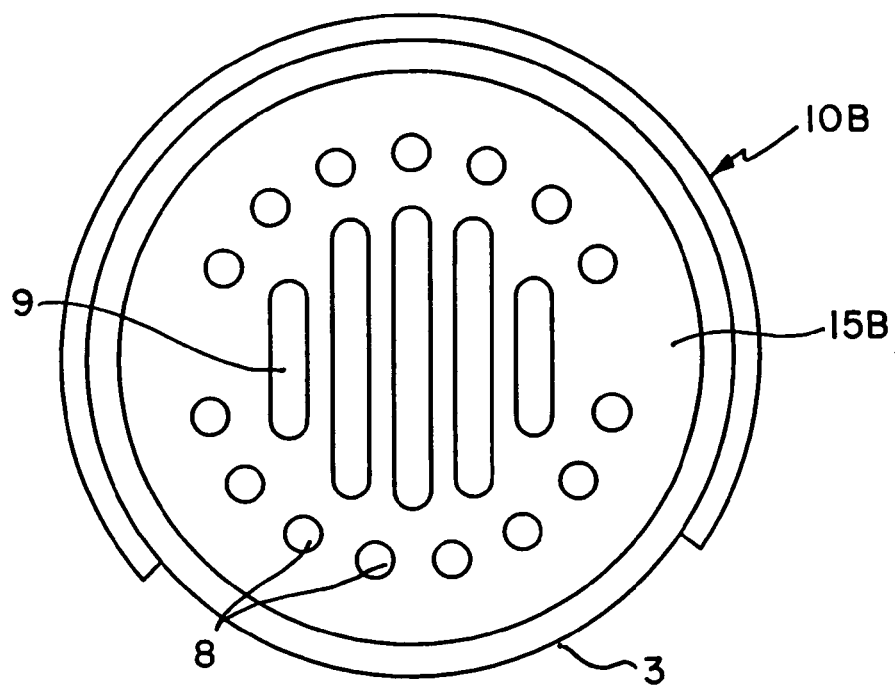
FIG. 4 is a top plan view of the grill body as shown in FIG. 3.
Figure 6:
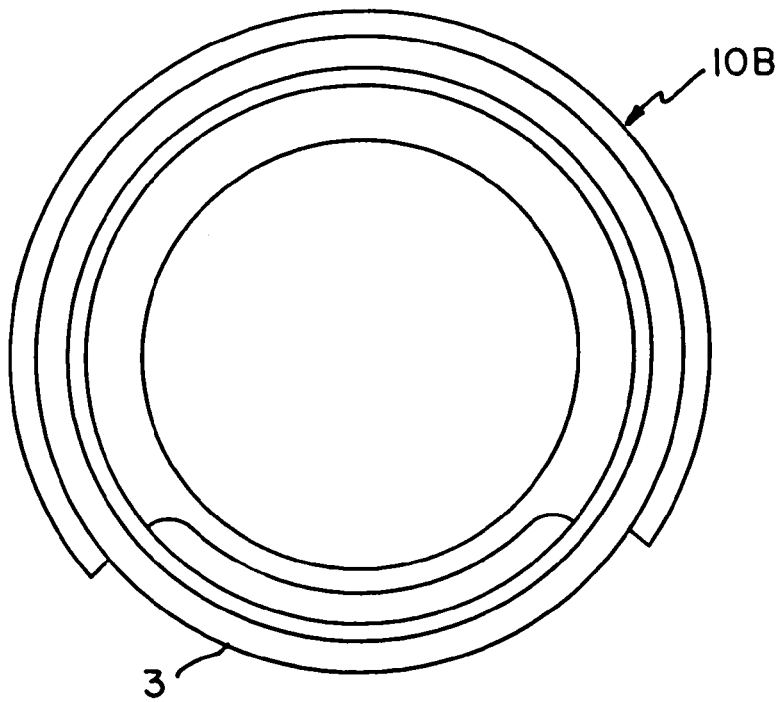
FIG. 6 is a bottom plan view of the grill body as shown in FIG. 3.

Referring now to FIGS. 1 and 2 a bench top grill assembly 1 includes a rigid continuous grill body 10B and a grill grate 15. Grill body 10B substantially bounds and encloses an inner volume and defines a top opening 2 and a side or lateral opening 3. Side opening 3 is arranged on a side of grill body 10B along a plane generally perpendicular through planes of both top opening 2 and an inner bottom surface 6 (shown later) of grill body 10B.

A grill grate 15 is removably positionable over top opening 2. Grill grate 15 may be either a substantially circular grill grate 15B (as shown), or a substantially rectilinear grill grate 15A (as will be shown). A plurality of holes 8 and slots 9 extending through grill plate 15B and allow access from an outside to the inner volume.

A removable fuel container 11 having a handle 11C is readily insertable and removable through side opening 3. Handle 11C projects from fuel container 11 substantially perpendicular to a bottom of fuel container 11 and allows easy insertion, withdrawal, and repositioning during a use. Handle 11C projects sufficiently distant from both grill body 10B and fuel container 11 to prevent thermal heating. Consequently, handle 11C operates as a safety mechanism for the present invention.

A rotatable support table 14A supports grill body 10B spaced apart from a work surface (not shown). Support table 14A allows a user to rotate grill body 10B relative to the work surface to allow a user to grasp handle 11C and remove fuel container 11 for replenishment.

As shown, a pedestal 14C supports rotatable support table 14A and a bearing race (not shown) rotatably joins support table 14A and pedestal 14C. Alternative embodiments of the present invention envision fixed and differently shaped support tables. In any embodiment, carry handles may be fixed to the support tables to allow for safe transport between desired work surfaces.

At least one groove 16 is scribed along a surface of support table 14A. As shown two grooves 16, 16 extend in parallel along either side of grill body 10B. At least one fork 15, commonly understood as a grill or long fork, has a round handle, which rests within groove 16. Groove 16 prevents fork 15 from rolling off support table 14A during rotation and use. Alternative embodiments envision additional or differently positioned grooves 16. One alternative embodiment provides two additional grooves perpendicular to the pair of grooves 16, 16 shown.

A set of condiment dishes 12A, 12B, 12C and 12D rest within respective condiment depressions or recesses 17A, 17B, 17C, and 17D(shown later) on a surface of support table 14A. During use of grill assembly 1, condiment dishes 12A–12D may contain items to be grilled or melted such as marshmallows, vegetable slices, meats, sauces, etc. depending upon a user's desire. The condiment depressions receive bottom portions of condiment dishes 12A–12D and prevent condiment dishes 12A–12D from sliding relative to a surface of support table 14A during rotation and use. A grill body depression 17E (also shown later) similarly receives a bottom portion of grill body 10B and prevents grill body 10B from movement relative to the surface of support table 14A during rotation and use.

As shown in FIG. 2, grill body 10B has a generally pot-bellied shape with a wide middle and a narrower top and bottom.

Referring now to FIGS. 3 through 6, grill body 10B includes a receiving receptacle 13 on inner bottom surface 6 bounded at least in part by a bottom guide 7. As shown, grill body 10B employs generally circular grill plate 15B. During operation and use, removable fuel container 11 is positioned by handle 11C through lateral or side opening 3 onto receiving receptacle 13. When support table 14A is rotated or carried to another location, receiving receptacle 13 and bottom guides 7 stabilize removable fuel container 11 and prevent tipping while not substantially interfering with easy removal. In alternative embodiments of the present invention, at least one of receiving receptacle 13 and bottom guides 7 are formed to help center removable fuel container 11 beneath top opening 2 and grill plate 15B.

Figure 7:
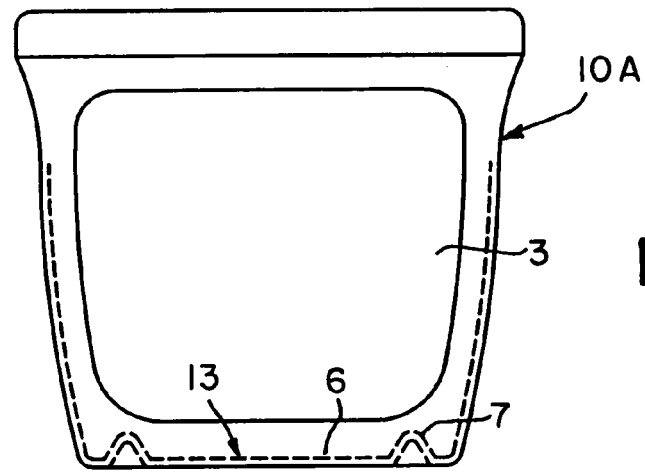
FIG. 7 is a side elevational view of a rigid grill body according to another embodiment of the present invention.
Figure 8:
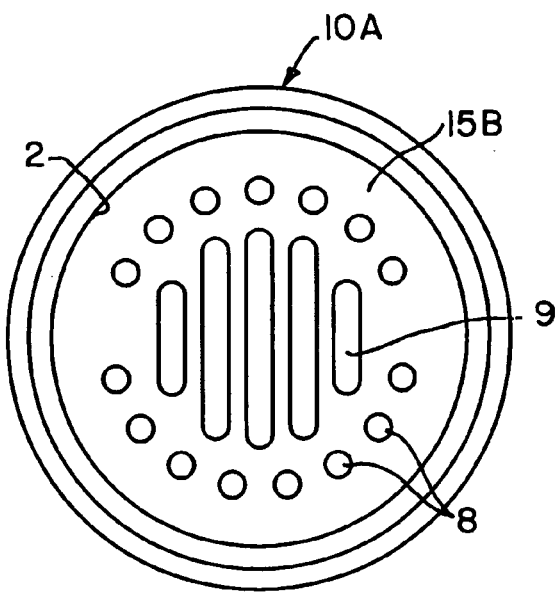
FIG. 8 is a top plan view of the grill body as shown in FIG. 7.
Figure 9:
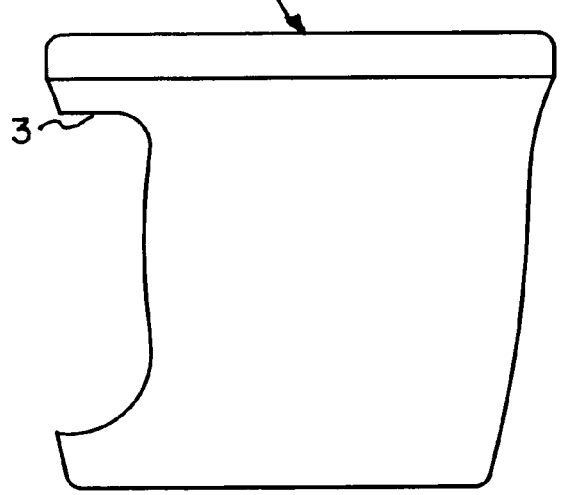
FIG. 9 is a side elevational view of the grill body as shown in FIG. 7.

Referring now to FIGS. 7 through 9, an alternative grill body 10A provides a generally frusto-conical shape with a generally smaller bottom and a generally larger top, as shown. As with the previous embodiment, grill body 10A employs generally circular grill plate 15B. Lateral or side opening 3 allows easy access by removable fuel container 11 to receiving receptacle 13.

Figure 12:
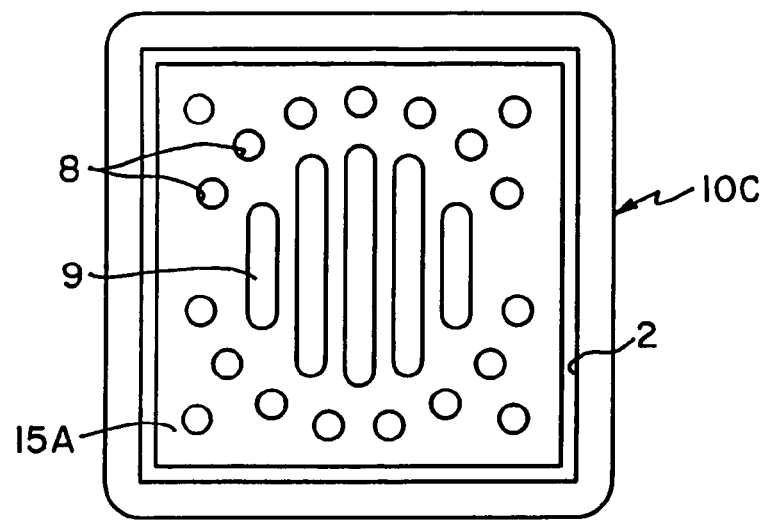
FIG. 12 is a top plan view of the grill body as shown in FIG. 10.
Figure 10:
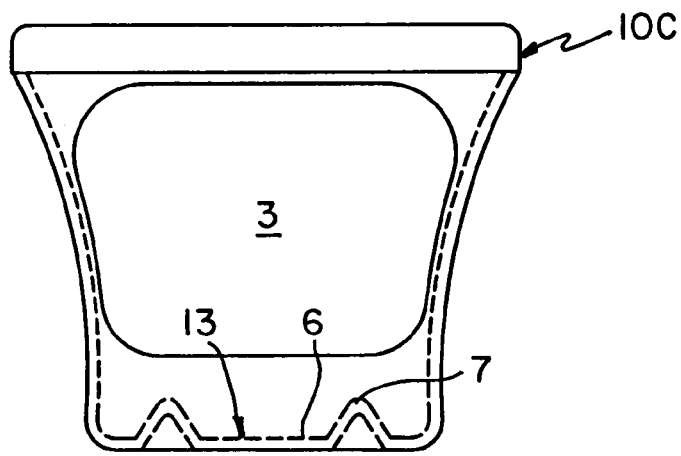
FIG. 10 is a side elevational view of a rigid grill body according to another embodiment of the present invention.
Figure 11:
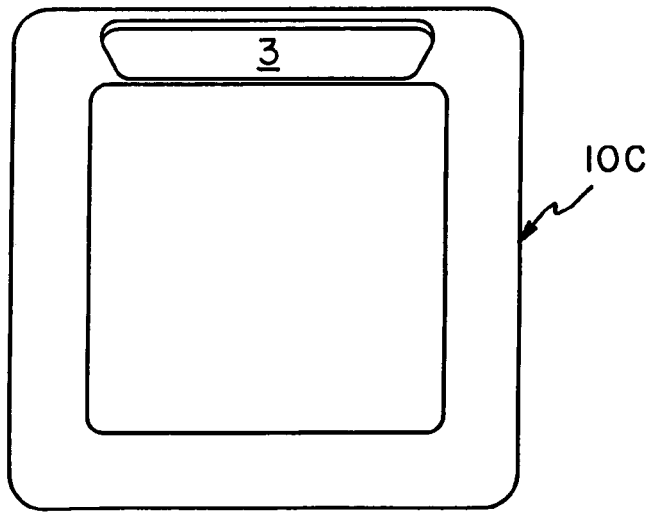
FIG. 11 is a bottom plan view of the grill body as shown in FIG. 10.
Figure 13:
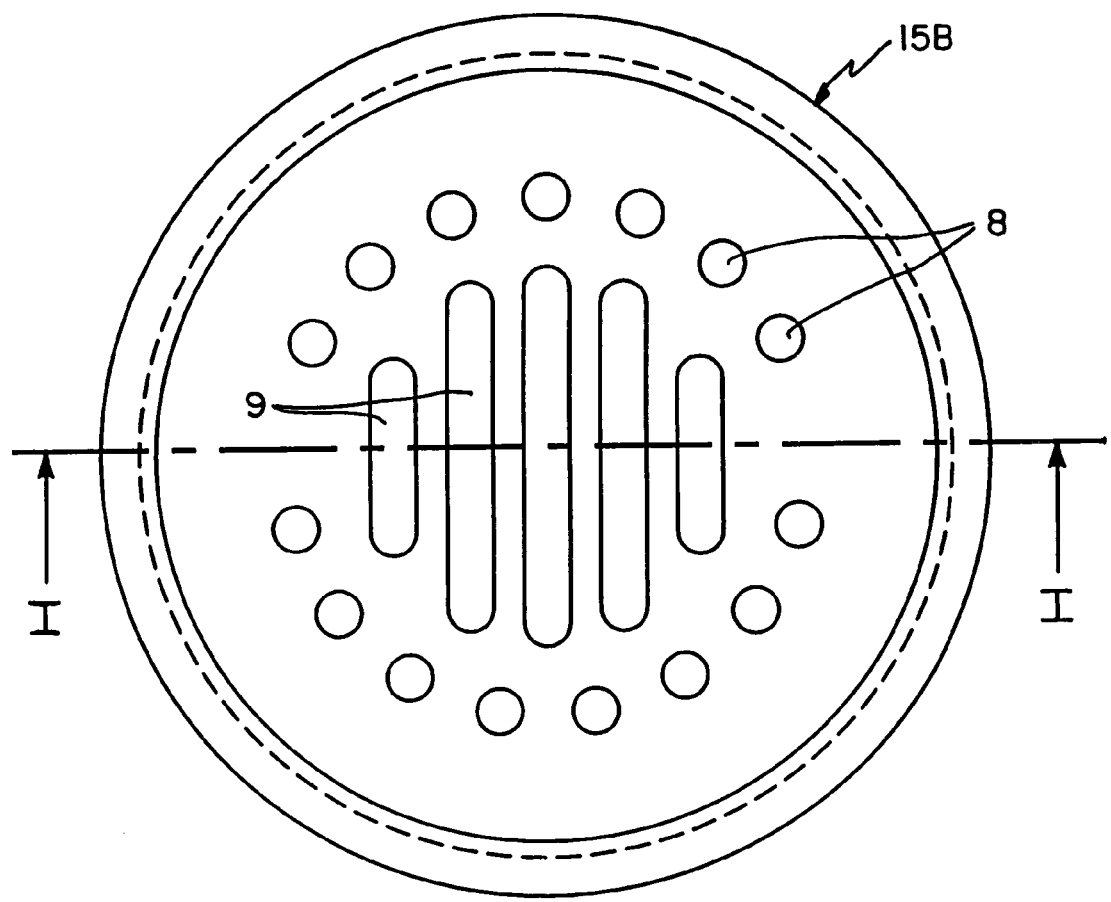
FIG. 13 is a top plan view of a grill grate according to one embodiment of the present invention.
Figure 14:
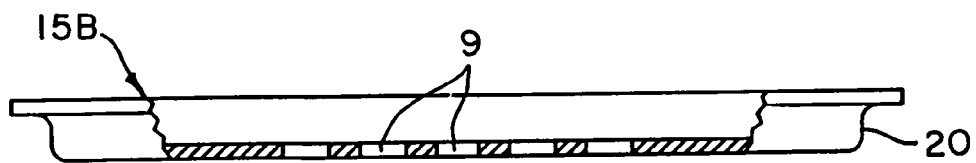
FIG. 14 is a sectional view taken along section I—I in FIG. 13.
Figure 15:
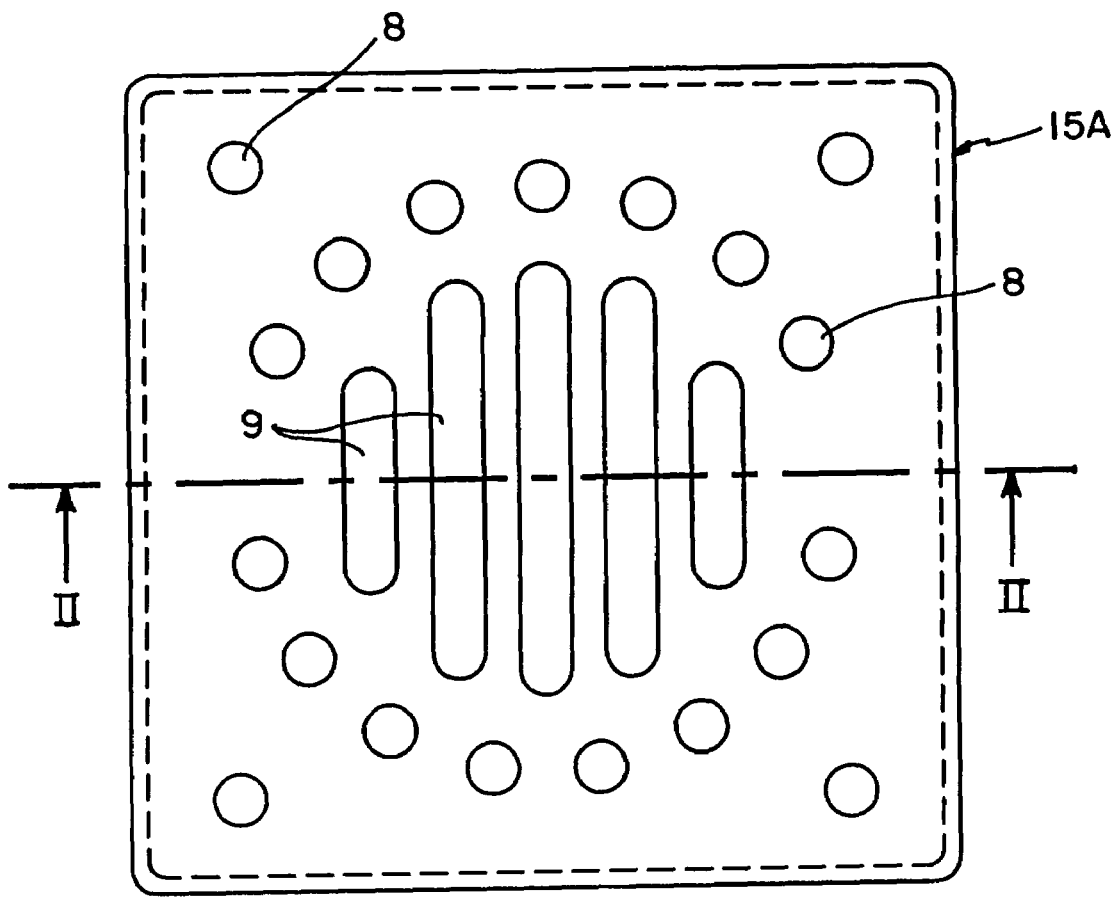
FIG. 15 is a top plan view of a grill grate according to one embodiment of the present invention.
Figure 16:
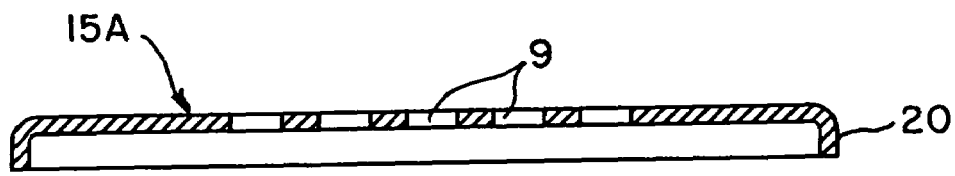
FIG. 16 is a sectional view taken along section II—II in FIG. 15.
Figure 18:
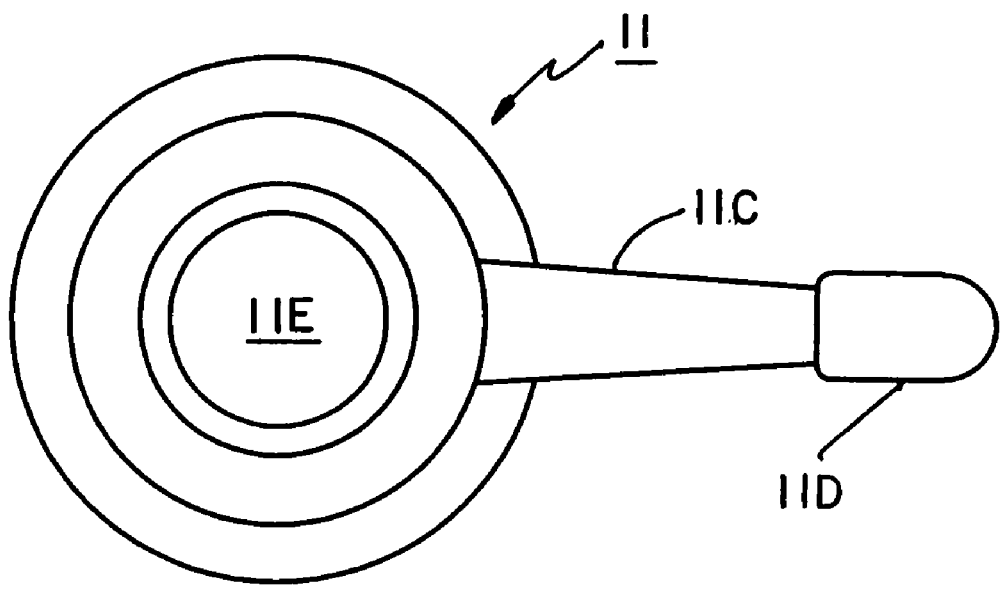
FIG. 18 is a top plan view of the removable fuel container shown in FIG. 17.
Figure 17:
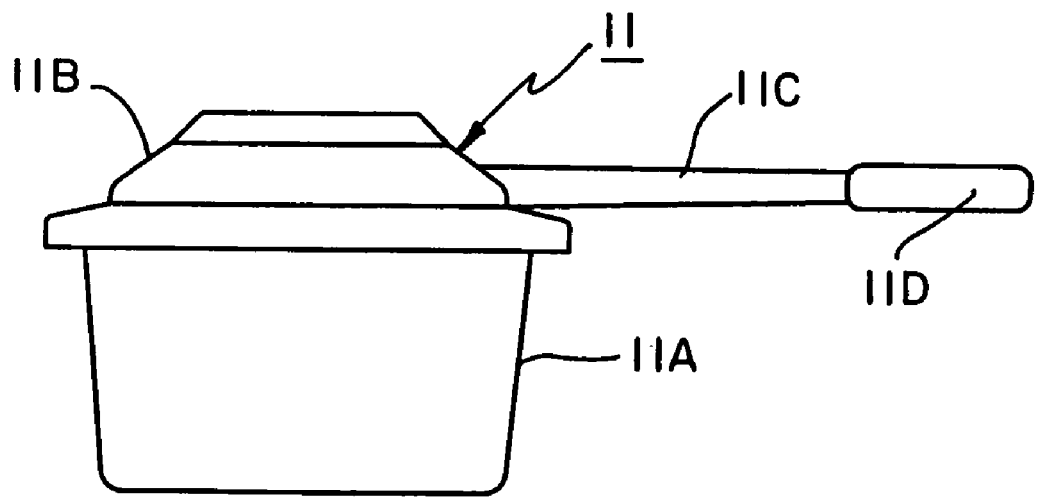
FIG. 17 is a side elevational view of a removable fuel container according to one embodiment of the present invention.

Referring now to FIGS. 10 through 12, an alternative grill body 10C provides a generally frustum-shaped form with a generally smaller bottom and a generally larger top, as shown. In this embodiment a generally rectangular grill grate 15A fits in top opening 2 on grill body 10C and provides a different patter of holes 8 and slots 9.

Referring now to FIGS. 13 through 16, both grill grate 15A and grill grate 15B, include a small lip portion 20 that engages corresponding portions of top opening 2 on respective embodiments of grill bodies 10A, 10B, and 10C. As can be seen from the Figures, holes 8 and slots 9 extend through grill grates 15A, 15B in a variety of patterns and allow both heat and potentially flame rising from fuel container 11 to extend above top opening 2.

Referring now to FIGS., 17 and 18, removable fuel container 11 includes handle 11C, a removable top 11B and a bottom 11A. Top 11B bounds a flame opening 1E allowing heat and flame to rise from an ignited external solid/semi-solid fuel element retained within fuel container 11 toward respective grates 15A, 15B and top openings 2. A grip 11D is positioned at an end of handle 11C to provide gripping comfort to a user and an additional measure of thermal protection during use.

Figure 19:
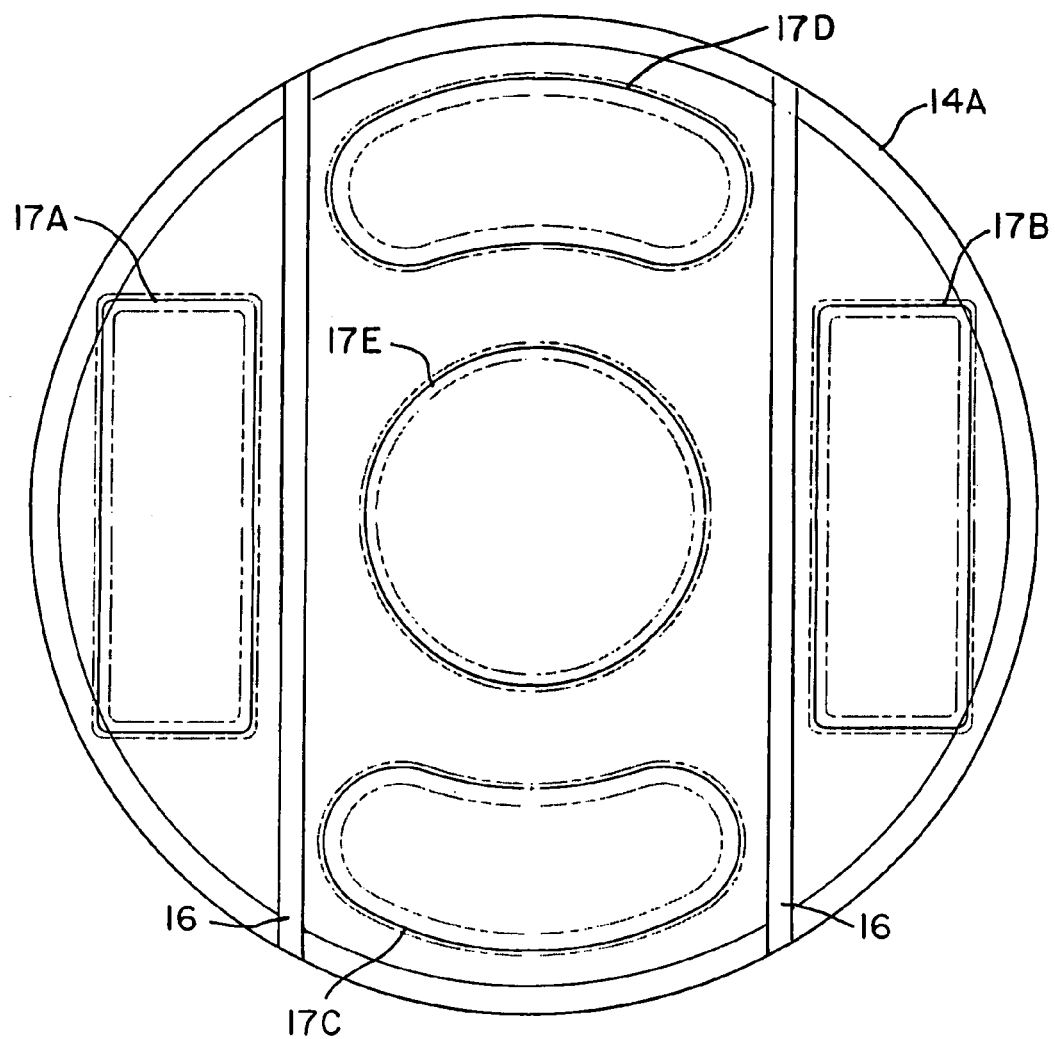
FIG. 19 is a top plan view of the support table according to one embodiment of the present invention.
Figure 20:
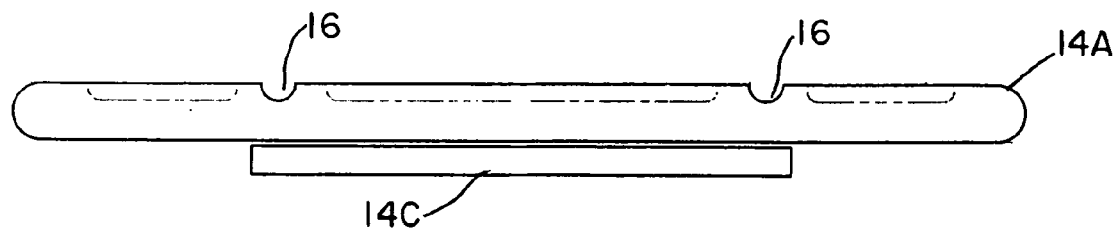
FIG. 20 is a side elevational view of the support table according to one embodiment of the present invention.

Referring now to FIGS. 19 and 20, support table 14A is shown without condiment dishes 12A–12D. Support table 14A includes pedestal 14C supporting table 14A distant from a work surface, not shown. As shown, condiment depressions 17A–17D are depressed below a top-surface of support table 14A and prevent condiment dishes 12A–12D from sliding relative to support table 14A during rotation. Grill body depression 17E is shown as a circle but may alternatively be a rectilinear shape to stabilize a bottom of frustum-shaped grill body 10C. It should be understood that depressions 17A–17E may be repositioned on support table 14A in alternative positions as desired by a customer or a manufacturer. The present positioning provides a safety benefit as the weight of a grill body is centered for easy lifting and rotation. Alternative embodiments may also provide handles extending from support table 14A to enable easy lifting and transport. As noted above, alternative designs for support table 14A include revolving and non-revolving tables, tables without feet, tables without condiment depressions or grooves, all depending upon consumer and manufacturer demand.

The present invention provides important convenience and safety features. One feature is that removable fuel container 11, has a removable top 11B. This configuration allows an external solid/semi-solid fuel source to be removably positioned and safely contained in fuel container 11. Since there are two side walls involved, from the fuel source and the fuel container, radial thermal transfer is lessened and the outside of fuel container 11 is cooler.

As a convenience, top 11B has flame opening 11E which safely directs any flame upward and prevents any air drafts from disturbing the flames and spot-heating the sides of grill bodies 10A–10C. Additionally, handle 11C with grip 11D extends safely beyond lateral or side opening 3 and allows a user to manipulate fuel container 11 without disturbing either grill bodies 10A–10C, condiment dishes 12A–12D, or grill grates 15A, 15B.

As an additional safety feature grill bodies 10A–10C are continuous rigid bodies substantially bounding both an inner volume and receiving receptacle 13. This design prevents lateral wind gusts, while allowing easy access and sufficient airflow during use. This design also prevents unintended contact with flame from the external fuel source. Finally, this design provides double guards to the flame through both the walls fuel container 11 (with top 11B) and rigid substantially continuous walls of grill bodies 10A–10C. Since walls of grill bodies 10A–10C are substantially continuous, they do not include flimsy wire construction, multiple holes, or other weaknesses in design previously available. In all, the present design provides multiple safety and convenience features not previously existing.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included without departing from the scope or spirit of the invention as defined in the following claims.

What is claimed is:

1. A bench top grill kit, comprising:
   a generally rigid grill body element defining an interior region and a top opening generally above said interior region:
   a heat source physically disconnected from said grill body and being freely movable relative thereto either positioned inside said grill body generally below said top opening or outside said grill body;
   a grate in said grill body element, generally covering said top opening;
   said grate being positioned above said heat source within a path of grilling heat rising upwardly from said heat source; and
   a plurality of utensils for securing and holding a food product above said grate within said path of upwardly rising grilling heat, when said heat source is moved into an positioned within said grill body element below said top opening.

2. A bench top grill kit, according to claim 1, wherein:
   said heat source includes a fuel container effective to contain an external fuel element while allowing a flame to escape through a flame opening proximate said grate during a grilling use.

3. A bench top grill kit, according to claim 2, further comprising:
   a support table member supporting and thermally spacing said grill body element from a supporting work surface, thereby minimizing a heating of said work surface during said grilling use; and
   said support table being at least one of a rotatable support table and a fixed support table.

4. A bench top grill kit, according to claim 3, further comprising:
   at least one recess on a top surface of said support table member.

5. A bench top grill kit, according to claim 4, wherein:
   said at least one recess shaped to receive at least one of said plurality of utensils, at least one food product, at least one food product container, and said grill body element, said at least one recess minimizing a shifting of said one relative to said top surface during said grilling use and a transport, whereby a convenience and a safety of said bench top grill kit is increased.

6. A bench top grill kit, according to claim 2, wherein:
   said heat source includes a handle extending outwardly from said fuel container, whereby said handle minimizes an outwardly thermal transfer of said grilling heat to a tip region of said handle and enables a safe manipulation of said heat source during said grilling use.

7. A bench top grill kit, comprising:
a generally rigid grill body element defining an interior region and a top opening generally above said interior region;
a heat source physically disconnected from said grill body and being freely movable relative thereto either positioned inside said arill body generally below said top opening or outside said grill body;
means for securing said heat source generally centrally within a grill body element;
a grate in said grill body element;
said grate positioned above said heat source within a path of grilling heat rising upwardly from said heat source;
at least one utensil for securing and holding a food product above said grate within said path of upwardly rising grilling heat; and
a support table member disposed below said grid body and said heat source, said support table member elevating said grill body and heat source above a support work surface and thermally spacing said grill body element from the supporting work surface, thereby minimizing heating of the work surface during grilling use.

8. A bench top grill kit, according to claim 7, wherein:
said means for securing includes a said fuel container effective to contain an external fuel element while allowing a flame to escape through a flame opening proximate said grate when said fuel container is in said fuel container.

9. A bench top grill kit, according to claim 8, further comprising:
at least one recess on a top surface of said support table member; and
said at least one recess is shaped to receive at least one of said plurality of utensils, at least one food product, at least one condiment container, and said grill body element, said at least one recess minimizing a shifting of said one relative to said top surface during said grilling use and a transport, whereby a convenience and a safety of said bench top grill kit is increased.

10. A bench top grill assembly, comprising:
a generally rigid grill body element defining an interior region and a top opening generally above said interior region;
a heat source physically disconnected from said grill body and being freely movable relative thereto either positioned inside said grill body generally below said top opening or outside said grill body;
said grill body being a rigid body defining an inner region and a top opening;
at least a side opening in said grill body positioned between said top opening and said inner support means;
a grill grate;
said grill grate providing a divided access to said inner region of said grill body;
said grill grate removably positionable on said top opening and separable from said grill body during a use, whereby said top opening and said grill grate enable grilling over at least one of an open flame and a grated flame;
said fuel container operably capable of containing a fuel element while allowing a flame to escape through a flame opening proximate said top opening when said fuel container is in said inner support means; and
a support table member disposed below said grid body and said heat source, said support table member elevating said grill body and heat source above a support work surface and spacing said grill body from a supporting work surface, thereby minimizing a heating of said work surface during a use.

11. A bench top grill assembly, according to claim 10, further comprising:
a handle extending from said fuel container; and
said handle projecting through said side opening away from said grill body during said use, whereby said handle does not become heated and is easily grasped during a use to facilitate a safe operation of said bench top grill.

12. A bench top grill assembly, according to claim 11, wherein:
said handle includes one of a means for adjusting a fuel combustion rate in said fuel container during said use and a means for ending a fuel combustion after said use.

13. A bench top grill assembly, comprising:
a generally rigid grill body element defining an interior region and a top opening generally above said interior region;
a heat source physically disconnected from said grill body and being freely movable relative thereto either positioned inside said grill body generally below said top opening or outside said arill body;
said grill body being a rigid body substantially bounding an inner volume and defining a top opening;
at least one side of said grill body having a side opening;
a substantially planar grill grate;
said grill grate providing access to an inside of said grill housing;
said grill grate on said top opening and separable from said grill body during a use, whereby said top opening and said grill grate enable a grilling over at least one of an open flame and a grated flame;
a fuel container not connected to said grill body and being freely movable relative thereto and positionable below said top opening having an elongate handle connected to said fuel container for moving said fuel container when gripped by a user;
said side opening having a shape allowing said handle to project through said side opening and directed away from said grill body during use;
said fuel container operably capable of containing a fuel element while allowing a flame to project thermal energy toward at least said top opening; and
means for at least one of terminating a combustion of a fuel in said fuel container, adjusting a combustion rate of said fuel, and adjusting a flame opening in said fuel container, whereby said projecting handle remains cool allowing a user to grasp said handle and manipulate said means for at least one thereby increasing at least one of a grilling safety and a grilling convenience.

14. A bench top grill kit, comprising:
a generally rigid grill body element defining an interior region and a top opening generally above said interior region;
a heat source physically disconnected from said grill body and being freely movable relative thereto either positioned inside said grill body generally below said top opening or outside said grill body;
said grill body being a rigid continuous body substantially bounding an inner volume and defining at least a top opening;
means not connected to said grill body for producing thermal energy in said grill body and being freely movable relative to said grill body;

a grill grate on said top opening and separable from said grill body and enabling outwardly flow of said thermal energy from said means for producing through said top opening;

a support table disposed below said grid body and said heat source, said support table member elevating said arill body and heat source above a support work surface and spacing at least said grill body from an external work surface;

at least one recess on a top surface of said support table; and said at least one recess shaped to receive at least one of said grill body, a grilling utensil, at least one condiment, and at least one condiment container, said at least one recess minimizing a shifting of said one relative to said top surface during said use and transport, whereby a convenience and a safety of said bench top grill kit is increased.

15. A bench top grill kit, according to claim 14, in combination with:

a generally cylindrical petroleum-based heating canister; and said means for producing thermal energy containing said canister, whereby said canister enables a safe containment of said thermal energy during a use while said means for producing includes a means for grasping said means for producing distant from said heating canister, thereby enabling a user to safely control said canister during said use.

16. A bench top grill kit, comprising:

a generally rigid grill body element defining an interior region and a top opening generally above said interior region;

a heat source physically disconnected from said grill body and being freely movable relative thereto either positioned inside said grill body generally below said top opening or outside said grill body;

said grill body being a rigid continuous body substantially bounding an inner volume and defining at least a top opening opposite an inner bottom surface;

means for producing thermal energy in said grill body connected to said fuel container for moving said fuel container when aripped by a user;

a grill grate removably positioned on said grill body for enabling a divided outwardly flow of said thermal energy from said means for producing through said top opening;

a support table disposed below said grid body and said heat source, said support table member elevating said grill body and heat source above a support work surface and spacing at least said grill body from an external work surface;

a heating canister;

said means for producing thermal energy containing said canister and an elongate handle element, whereby said canister enables a safe upward direction of said thermal energy during use while said handle element provides a simple means for grasping and freely moving said means for producing prior to or after said use;

at least one recess on a top surface of said support table member; and said at least one recess shaped to receive at least one of a grilling utensil, at least one condiment, at least one condiment container, and said grill body member, said at least one recess minimizing a shifting of said one relative to said top surface during said use and transport, whereby a convenience and a safety of said bench top grill kit is increased.

17. A bench top grill kit, comprising:

a generally rigid grill body element defining an interior region and a top opening generally above said interior region;

a heat source physically disconnected from said grill body and being freely movable relative thereto either positioned inside said grill body generally below said ton opening or outside said grill body;

said grill body being a rigid body effective to bound an inner volume and define at least a top opening;

means for producing thermal energy in said grill body not connected to said grill body and being freely movable relative to said grill body;

a grill grate on said top opening enabling a divided outwardly flow of said thermal energy from said means for producing through said top opening;

a support table disposed below said grid body and said heat source, said support table member elevating said grill body and heat source above a support work surface and spacing said grill body from an external work surface;

at least one recess on a top surface of said support table; and said at least one recess shaped to positionably receive at least one of said grill body, at least one grilling utensil, at least one condiment, and at least one condiment container, whereby said at least one recess minimizes a shifting of said one relative to said top surface during said use and a transport and increasing a convenience and a safety of said bench top grill kit.

18. A bench top grill kit assembly, comprising:

a generally rigid grill body element defining an interior region and a top opening generally above said interior region;

a heat source physically disconnected from said grill body and being freely movable relative thereto either positioned inside said grill body generally below said top opening or outside said grill body;

a grill body being a rigid body bounding an inner volume and defining a top opening;

at least one a side opening in said grill body not connected to said grill body and being freely movable relative to said grill body;

a grill grate spanning said top opening and providing a divided access to an inside of said grill body;

a fuel container containing an external fuel element while allowing a flame to escape upwardly through a flame opening proximate said top opening during a use;

a support table member thermally spacing said grill body from a supporting work surface, thereby minimizing a heating of said work surface during use;

an elongate handle projecting from said fuel container and through said grill body in a direction away from said fuel container for enabling the gripping of said fuel container.

* * * * *